United States Patent [19]
Lewis

[11] 3,895,869
[45] July 22, 1975

[54] HEADING SENSOR WITH COMPENSATION WINDINGS

[75] Inventor: Richard W. Lewis, Derby, Kans.

[73] Assignee: The Boeing Company, Seattle, Wash.

[22] Filed: June 17, 1974

[21] Appl. No.: 480,055

[52] U.S. Cl. .............. 335/296; 235/150.27; 340/24
[51] Int. Cl. ............................................. H01f 3/00
[58] Field of Search ........... 335/209, 296, 299, 297; 340/24; 235/150.27

[56] References Cited
UNITED STATES PATENTS
| | | | |
|---|---|---|---|
| 3,596,069 | 7/1971 | Burt | 235/150.27 |
| 3,749,893 | 7/1973 | Hileman | 235/150.27 |
| 3,840,726 | 10/1974 | Harrison | 235/150.27 |

*Primary Examiner*—G. Harris
*Attorney, Agent, or Firm*—Christensen, O'Connor, Garrison, & Havelka

[57] ABSTRACT

A heading sensor suitable for magnetically sensing the heading of a vehicle, such as an automobile, with respect to the earth's magnetic field is disclosed. The heading sensor comprises a square core formed of a magnetically permeable material having wound thereon an exciter winding, two pairs of sense windings and two or more compensation windings. The exciter winding is wound in the same direction (clockwise or counterclockwise) about all of the legs of the core and each sense winding is wound in the same direction (clockwise or counterclockwise) on parallel legs of the core. The compensation windings are wound about the resultant structure along orthogonal axes. In one form, two compensation windings are included and in another form three compensation windings are included.

6 Claims, 8 Drawing Figures

PATENTED JUL 22 1975
3,895,869
SHEET 1
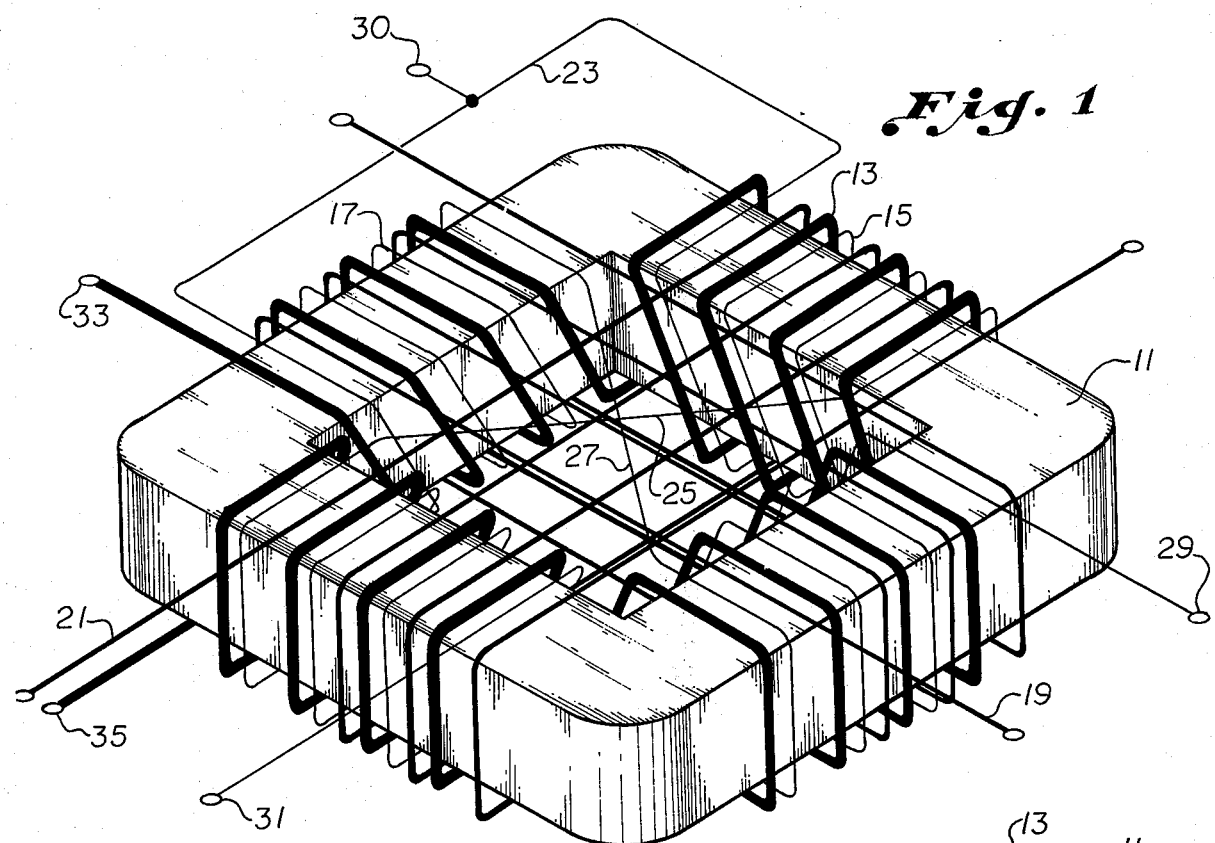
Fig. 1
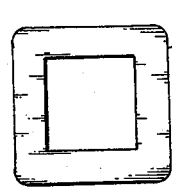
Fig. 2a
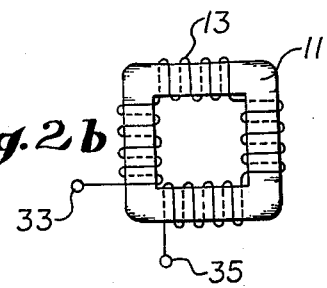
Fig. 2b
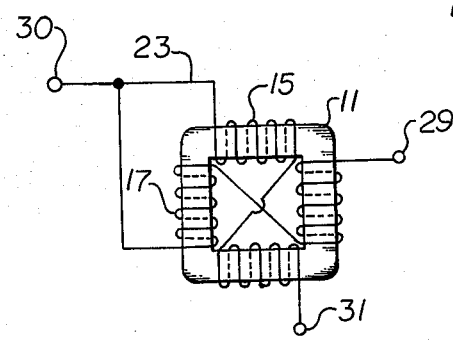
Fig. 2c
Fig. 2d
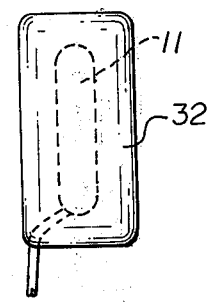
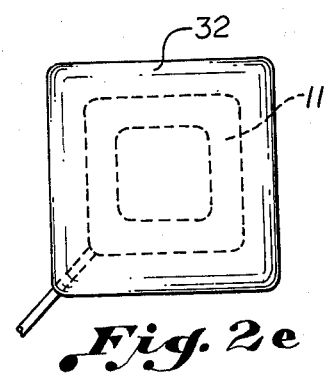
Fig. 2e
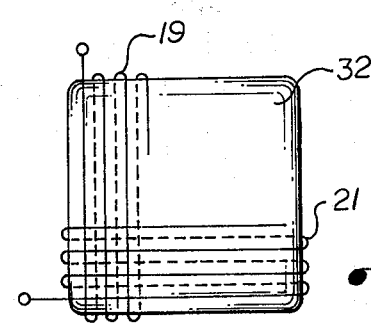
Fig. 2f

HEADING SENSOR WITH COMPENSATION WINDINGS

BACKGROUND OF THE INVENTION

This invention is directed to heading sensors and more particularly to magnetic heading sensors suitable for sensing the heading of a vehicle, such as an automobile.

In many circumstances, it is desirable to know the direction, (heading) in which a vehicle is moving with respect to some predetermined direction, usually north. In some circumstances, it is desirable that the operator of the vehicle have this information readily available to him. In other circumstances, it is desirable that the vehicle transmit this information (plus distance traveled information) to a remote location in order for personnel at the remote location to be able to identify the location of the vehicle. More specifically, it has recently become desirable for certain organizations, such as police departments, to be able to identify the location of their vehicles at all times without requiring that the vehicle operators orally provide this information.

Various systems have been developed to provide the information denoted above. Some of these systems utilize a technique wherein the direction and distance of movement of a vehicle from a starting location is monitored. In one form such systems include means for generating heading and distance information mounted in each vehicle. This information is transmitted to the monitoring location and is used to continuously update previously stored data related to the position of the vehicle transmitting the information. Such a system is described in U.S. Pat. No. 3,789,198 issued Jan. 29, 1974, for "Vehicle Location Monitoring System". One of the problems with such systems relates to the difficulty in accurately sensing the heading of the vehicles. It is in this environment that the invention was developed and finds its most use.

The prior art has proposed a variety of devices directed to sensing the heading of a vehicle and providing an indication thereof. For various reasons these proposals have not been as successful as desired. For example, prior art systems which utilize a magnetic compass approach to sensing heading tend to have a large amount of over-swing whereby the information generated is relatively inaccurate. In one case, a standard commercially available compass was found to have an over-swing of approximately 20° when the automobile in which it was mounted slowly turned a 90° corner. Even larger errors were found to occur when such a turn was made after a previous swing. In another test using commercially available gimballed, liquid damped, flux gate sensors, it was found that they become pegged against their stops during linear acceleration and during rapid turning.

In an attempt to overcome the foregoing problems, non-gimballed magnetic flux gate heading sensors have been developed. While these sensors are very accurate when mounted in a nonferrous environment, large errors occur when they are mounted in a ferrous environment, i.e., in an automobile, for example. In the past, permanent magnets have been utilized to compensate for errors that occur when such a sensor is mounted in a ferrous environment. However, because such magnets tend to be rather small, they produce nonuniform fields within the sensor structure. Such fields in and of themselves result in some inaccuracies. Moreover, in many cases, the cores of flux gate sensors are toroidal in shape. Because they are toroidal in shape, they are more difficult to align than desired.

Therefore, it is an object of this invention to provide a new and improved heading sensor suitable for sensing the heading of a vehicle.

It is a further object of this invention to provide a vehicle heading sensor that is easy to align, operative in a ferrous environment and not affected by the acceleration, deceleration and turning actions of the vehicle.

It is a still further object of this invention to provide a new and improved flux gate type magnetic heading sensor which includes uncomplicated means for compensating for errors created by ferrous materials located near the sensor.

It is another object of this invention to provide a vehicle heading sensor wherein heading errors due to road crowns and hills are relatively small.

SUMMARY OF THE INVENTION

In accordance with principles of this invention, a new and improved heading sensor suitable for sensing the heading of a vehicle is provided. The heading sensor comprises a square core formed of a magnetically permeable material. An exciter winding is wound around at least one leg of the core and two sense windings are wound around the orthogonal legs of the core. The sense windings are wound around all of the legs of the core in a manner such that one sensing winding is wound about one set of parallel legs and the other is wound about the other set. In addition, a pair of compensation windings are wound about the core, and the exciter and sense windings. In operation, the excitation winding when suitably energized drives the core into and out of saturation. This action changes the intensity of the earth's magnetic field passing through the core. This change is sensed by the sense windings and, in accordance with vector analysis techniques is used to provide heading information.

In accordance with further principles of this invention, the exciter winding is wound around all of the legs of the core.

In accordance with still further principles of this invention, the compensation windings are formed of two orthogonally arrayed windings surrounding the core-exciter-sense winding combination.

In accordance with alternate principles of this invention, the compensation windings are three in number and are orthogonally arrayed, each with respect to the other two, around the core, exciter winding, and sense windings.

It will be appreciated from the foregoing brief summary that the invention provides a new and improved heading sensor. The use of a magnetic flux sensor having a square core surrounded by compensation windings results in a heading sensor that is considerably more accurate than are prior art flux gate sensors, especially when mounted in a ferrous environment. The sensor is easily aligned such that the ferrous environment has substantially no error effect on the resultant heading information developed. Moreover, the sensor can be aligned such that it provides heading information related to true north, magnetic north, or any other predetermined direction. Thus, the resultant information does not have to be corrected for the magnetic deviation that exists in the geographic region of use. Alignment is relatively easy because all that needs to be done is to control the current applied to the compensation windings. Such current control is easily accomplished through the use of potentiometers to control the DC voltage applied to the compensation windings.

Because the heading sensor of the invention does not require gimbal mounting, problems previously associated with acceleration, deceleration, or turning actions taken by the vehicle in which it is mounted have no effect. Thus, the invention overcomes the disadvantages of prior art sensors of the type described above. In addition, it does not have the problem of prior art magnetic heading flux gate type heading sensors using small permanent magnets to provide compensation.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a perspective view of a preferred embodiment of the invention;

FIGS. 2a-f are sequential views depicting the formation of a preferred embodiment of the invention of the type illustrated in FIG. 1; and, FIG. 3 is a perspective view of an alternative preferred embodiment of the invention.

DESCRIPTION OF THE PREFERRED EMBODIMENT

Figure 3:
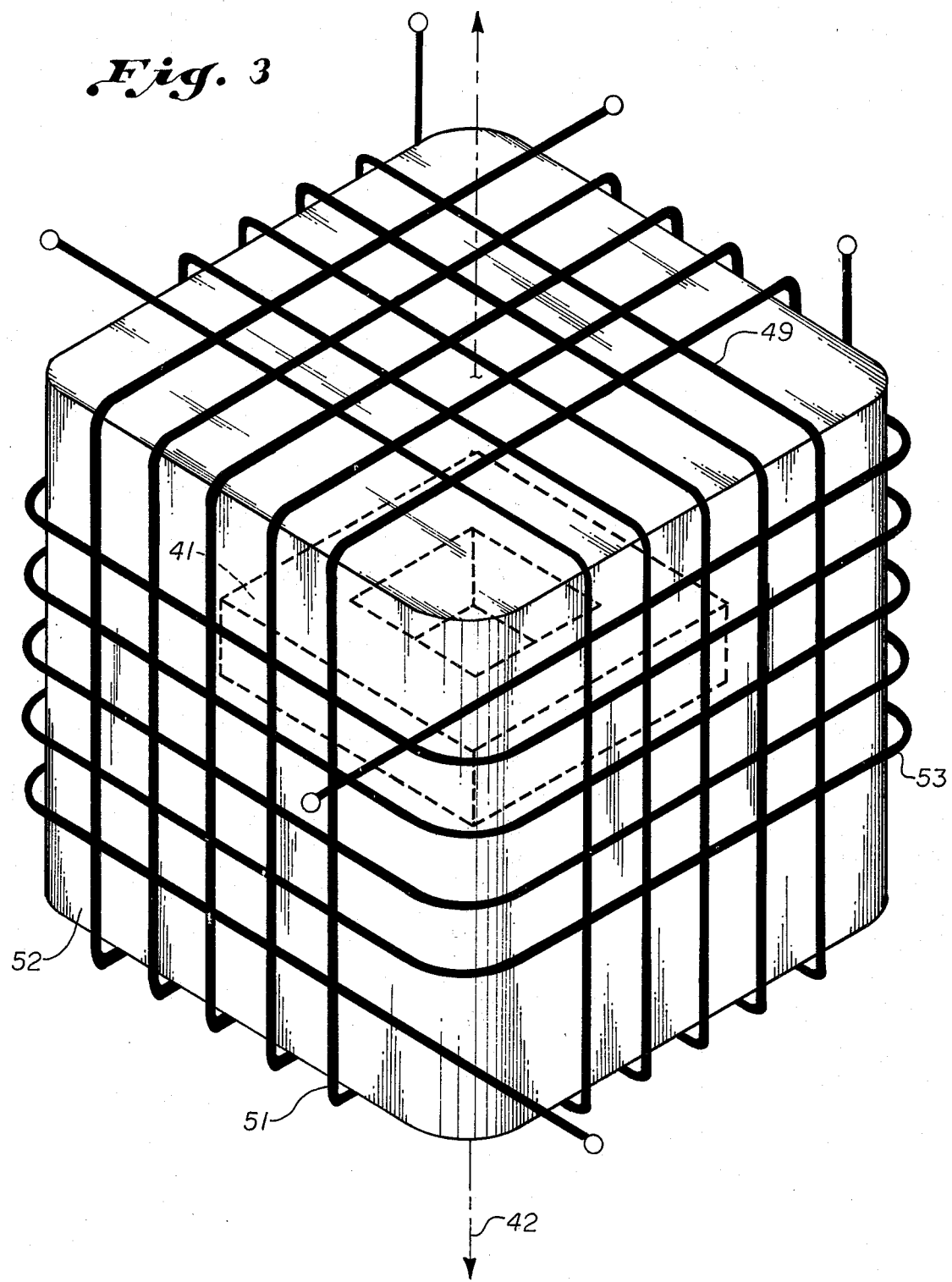

FIG. 1 illustrates a first preferred embodiment of the invention which includes compensation for the apparent shift in the earth's magnetic field introduced by ferrous materials in the vehicle in a plane tangent to the earth's surface at the vehicle's location. In many geographical areas, such compensation is adequate. More specifically, when the heading sensor of the invention is utilized in a vehicle, such as an automobile, horizontal compensation only is necessary if the vehicle is used in a generally flat geographical area. In such an area of use, vertical compensation will remove the vertical component reducing the magnetic bias level, but may not improve heading accuracy. Even in hilly regions, vertical compensation with respect to the vehicle will not completely cancel the earth's vertical magnetic component. However, the resultant heading errors have been found to be insignificant. As will be better understood from the following description, the embodiment of the invention illustrated in FIG. 3 compensates for vertical induced fields, as well as horizontal induced fields.

The embodiment of the invention illustrated in FIG. 1 comprises a square core 11; an exciter winding 13; two pairs of sense windings 15 and 17; and, two compensation windings 19 and 21. For ease of illustration and understanding, the thickness of the wires making up the various windings in FIG. 1 vary substantially. However, these variations are not to be taken as an indication of the actual wire thickness to be used. Moreover, for clarity of illustrations only a few of the number of wire turns are illustrated.

The exciter winding 13 is wound in the same direction around all four legs of the square core 11. For example, the exciter winding may be wound in a counterclockwise direction. Preferably, the turns are spaced evenly. The total number of turns on each leg may vary as desired, even though the same number on each leg is preferred—375 turns per leg, for example.

FIG. 2a illustrates the core 11 prior to the addition of the exciter winding 13. FIG. 2b illustrates the core 11 with the exciter winding 13 wound thereon in the manner discussed above. While the size of the core may vary, a 1 inch by 1 inch core (outside planar dimensions) formed of colodoin laminations bonded together with a suitable cement has been found to be suitable.

Subsequent to the installation of the exciter winding 13, the pairs of sense windings 15 and 17 are wound about the legs of the structure. Each pair of sense windings is wound in the same direction on one of the sets of parallel legs. That is, one sense winding is wound on one set of parallel legs and the other sense winding is wound on the other set of parallel legs.

As viewed in FIG. 1, the first pair of sense windings 15 is wound on the upper right and lower left set of parallel legs, and the second pair of sense windings 17 is would on the lower right and upper left set of parallel legs, respectively. Each related pair of sense windings is connected together by a cross coupling wire 25 or 27. As previously indicated, preferably, the sense windings are wound in the same direction (counterclockwise, for example). A wide variety of number of turns can be used. In one actual embodiment of the invention 800 turns per leg was found to be suitable. Preferably the turns are evenly spaced on each leg. If desired, as illustrated in FIGS. 1 and 2c, one end of each sense winding can be connected together by a suitable conductor 23. Conductor 23 may be an integral portion of the wire forming the sense windings and is connected to an output terminal 30. The other ends of the pairs of sense windings are each connected to an output terminal 29 and 31. Thereafter the resultant structure is encapsulated in a suitable material 32 as illustrated in FIGS. 2d and 2e.

In accordance with well known flux gate principles, when an AC current, or a pulsed DC current, is applied to the exciter winding via its input terminals 33 and 35, a varying magnetic field is created in the core 11. When a magnetic core is thusly excited into saturation and placed in a magnetic field, such as the earth's magnetic field, the magnetic components of that field vary the voltage across the sense windings. More specifically, as the core moves into and out of saturation the intensity of the earth's magnetic field passing through the core changes. This change varies the voltage across the sensing windings. The variation in voltage can be analyzed in accordance with standard vector analysis techniques to determine the direction of the magnetic field within which the core has been placed, with respect to the legs of the core. In this manner, the voltages generated across the sense windings provide information related to the direction of the magnetic field within which the core, and associated windings, have been placed. Thus, if the magnetic field is the earth's magnetic field and the core is affixed to an object, the directional relationship of that object with respect to the earth's magnetic field can be determined. Obviously, the resultant signal includes the magnetic deviation related to the geographical area in which the object is placed i.e., magnetic north, not true north, information is contained in the resultant signal.

While uncompensated flux gate heading sensors of the type just described are suitable for use in some environments, they have certain disadvantages when placed in other environments. Specifically, if the apparatus previously described is placed in an environment which includes ferrous materials, the ferrous materials may cause the resultant information to be in error. Specifically, the ferrous materials may produce a rotated field and/or nonuniform magnetic field in the heading sensor. This problem has been overcome in the prior art by arraying small permanent magnets in a manner such that they compensate for such distorted fields. However, it is difficult and, therefor time consuming and expensive, to align such a sensor. Moreover, the small magnets introduce fields which in and of themselves create nonuniformities. As described below, the invention provides a less complicated and more easily alignable system for overcoming this disadvantage.

After the exciter winding and the sense windings are applied, and the resultant structure encapsulated, the compensation windings 19 and 21 are orthogonally wound about the resultant structure such that they provide compensation in the plane defined by the structure. More specifically, when the compensation windings are energized in a suitable manner, as hereinafter described, they introduce magnetic fields that compensate for the error-causing magnetic fields created by the nearby ferrous elements.

The alignment (determination of compensation coil energization) of the heading sensor of the invention is accomplished by first horizontally mounting it in its environment of use i.e., the vehicle with which it is to be associated. The vehicle is then pointed in a predetermined direction. For example, the longitudinal axis of the vehicle can be placed on a north-south line. Thereafter, terminals 29, 30 and 31 are connected to a suitable indicating device, terminals 33 and 35 are connected to a suitable excitation source and the compensation windings are connected to suitable voltage sources through potentiometers. The potentiometers are then varied until the output from the indicating device provides an indication related to the north-south alignment of the vehicle. Thereafter, as the vehicle moves, changes in its direction will cause the output of the indicating device to display corresponding changes. If desired the information at terminals 29, 30 and 31 can be transmitted to a remote receiver. Further, after alignment, the local indicating device can be disconnected, if desired.

It has been found that the heading sensor of the invention is considerably more accurate than are prior art flux gate heading sensors that utilize toroidal (round) cores. In one test, a round core flux valve heading sensor produced a variation of 21° in heading when a vehicle headed west was tilted to produce an equivalent 8° slope by means of a hoist attached to the front of the vehicle. On the other hand, the square core flux valve formed in accordance with the invention produced only a 12° variation in heading for the same tilt. Thus, the invention is substantially more accurate than are prior art devices of a somewhat similar nature. In addition, the compensation problem of prior art devices of a similar nature is eliminated. In fact, not only can induced fields be compensated for, the earth's magnetic field declination can also be compensated for using the invention. That is, the compensation coils, preferably, are energized so as to compensate for the magnetic deviation of the earth's field in the geographic area of use as well as for vehicle induced fields. Thus, a true north indication, as opposed to a magnetic north indication, is provided by the invention.

FIG. 3 illustrates an alternative embodiment of the invention which includes vertical compensation as well as horizontal compensation. FIG. 3 illustrates a core 41 similar to the core illustrated in FIG. 1 that includes four legs. As with the embodiment of the invention illustrated in FIGS. 1 and 2, an exciter winding is wound around all four legs of the core in the same direction. In addition, two pairs of sense windings are wound about opposite sets of parallel legs of the core 41. The core 41 is mounted in a cubic housing 52 which may be formed by encapsulation, for example. Two orthogonal compensation windings 49 and 51 are wound in generally the same direction as are the compensation windings 19 and 21 illustrated in FIGS. 1 and 2f, about the housing 52.

The major change between the embodiment of the invention illustrated in FIG. 1 and the embodiment illustrated in FIG. 3 is the inclusion of a third compensation winding 53 wound orthogonally to the first two compensation windings. The third compensation winding compensates for vertical magnetic field components when the longitudinal axis 42 of the square center of the core 41 is vertically arrayed. Except for compensation along an additional axis, the embodiment of the invention illustrated in FIG. 3 is mounted, aligned and operated the same as the embodiment illustrated in FIG. 1.

While preferred embodiments of the invention have been illustrated and described, it will be appreciated that various changes can be made therein without departing from the spirit and scope of the invention. For example, the sense windings can be wound on the core prior to the exciter winding being wound thereon. In addition, if desired, insulation can be provided between the exciter and sense windings, over and above the insulation normally contained on the wires. Hence, the invention can be practiced otherwise than as specifically described herein.

The embodiment of the invention in which exclusive property or privilege is claimed is defined as follows:

What is claimed is:

1. A magnetic heading sensor suitable for use in a ferrous environment to sense magnetic heading with respect to the earth's magnetic field vector, said magnetic heading sensor comprising:

a square core formed of a magnetically permeable material, said square core defining two sets of parallel legs lying orthogonal to each other;

an excitation winding wound about at least one leg of said square core for electrically exciting said square core into and out of magnetic saturation when said excitation winding is connected to a suitable electrical excitation source;

a first sense winding wound about one of said sets of parallel legs so as to sense the change in the earth's magnetic field passing through said square core when said excitation winding is excited by a suitable electrical excitation source;

a second sense winding wound about the other of said sets of parallel legs so as to sense the change in the earth's magnetic field passing through said square core when said excitation winding is excited by a suitable electrical excitation source;

a first compensation winding, wound about said square core, said excitation winding and said first and second sense windings so as to encompass said square core, said excitation winding and said first and second sense windings along a first axis; and, a second compensation winding wound about said square core, said excitation winding and said first and second sense windings so as to encompass said square core, said excitation winding and said first and second sense windings along a second axis lying orthogonal to said first axis.

2. A magnetic heading sensor suitable for use in a ferrous environment as claimed in claim 1 wherein said excitation winding is wound about all of the legs defined by said square core.

3. A magnetic heading sensor suitable for use in a ferrous environment as claimed in claim 2 including a third compensation winding wound about said square core, said excitation winding and said first and second sense windings so as to encompass said square core, said excitation winding and said first and second sense windings along a third axis lying orthogonal to said first and second axes.

4. A magnetic heading sensor suitable for use in a ferrous environment as claimed in claim 3 including encapsulation means surrounding said square core, said excitation winding and said first and second sense windings for encapsulating said square core, said excitation winding and said first and second sense windings.

5. A magnetic heading sensor suitable for use in a ferrous environment as claimed in claim 1 including a third compensation winding wound about said square core, said excitation winding and said first and second sense windings so as to encompass said square core, said excitation winding and said first and second sense windings along a third axis lying orthogonal to said first and second axes.

6. A magnetic heading sensor suitable for use in a ferrous environment as claimed in claim 5 including encapsulation means surrounding said square core, said excitation winding and said first and second sense windings for encapsulating said square core, said excitation winding and said first and second sense windings.

* * * * *